US012095166B1

(12) United States Patent
Xing et al.

(10) Patent No.: US 12,095,166 B1
(45) Date of Patent: Sep. 17, 2024

(54) ANTENNAS FOR MANAGED DEVICES, AND RELATED SYSTEMS AND METHODS

(71) Applicant: Amazon Technologies, Inc., Seattle, WA (US)

(72) Inventors: Xinyu Xing, Bellevue, WA (US); Richard Muryanto, San Ramon, CA (US); Sajay Jose, Woodinville, WA (US); Khaled Ahmad Obeidat, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 214 days.

(21) Appl. No.: 17/708,101

(22) Filed: Mar. 30, 2022

(51) Int. Cl.
*H01Q 21/29* (2006.01)
*H01Q 5/378* (2015.01)
*H01Q 9/28* (2006.01)

(52) U.S. Cl.
CPC ............. *H01Q 21/29* (2013.01); *H01Q 5/378* (2015.01); *H01Q 9/28* (2013.01); *H01Q 9/285* (2013.01)

(58) Field of Classification Search
CPC ........ H01Q 5/40; H01Q 5/378; H01Q 19/106; H01Q 19/185; H01Q 1/2291; H01Q 21/29; H01Q 9/285; H01Q 9/28
USPC .......................................................... 343/895
See application file for complete search history.

(56) References Cited

U.S. PATENT DOCUMENTS

| | | | | |
|---|---|---|---|---|
| 5,966,102 A * | 10/1999 | Runyon | H01Q 21/08 343/820 |
| 11,690,924 B1 * | 7/2023 | Gokcebay | A61L 2/26 250/455.11 |
| 2004/0150561 A1 * | 8/2004 | Tillery | H01Q 21/08 343/846 |
| 2015/0035708 A1 * | 2/2015 | Liu | H01Q 1/3216 343/713 |
| 2016/0254595 A1 * | 9/2016 | Sobczak | H01Q 9/045 343/702 |
| 2018/0034166 A1 * | 2/2018 | Hinman | H01Q 3/36 |
| 2020/0251809 A1 * | 8/2020 | Hanada | B62D 49/00 |
| 2022/0051514 A1 * | 2/2022 | Schmidt | G06Q 20/3276 |
| 2023/0267786 A1 * | 8/2023 | Kashi | G07C 9/00912 70/63 |

* cited by examiner

*Primary Examiner* — Hai V Tran
(74) *Attorney, Agent, or Firm* — BakerHostetler

(57) ABSTRACT

An antenna assembly includes a housing and first and second antennas enclosed within the housing. The first antenna provides a first radiation pattern oriented for wireless communication with a cloud-based network. The second antenna provides a second radiation pattern that is oriented different than the first radiation pattern and is oriented for wireless communication with a portable user device.

17 Claims, 9 Drawing Sheets

| | EFFI.% | EFFI.dB | Peak Gain dB |
|---|---|---|---|
| 1556 | 43% | −3.7 | 3.7 |
| 1575 | 42% | −3.8 | 3.3 |
| 1607 | 42% | −3.8 | 3.7 |
| 1601 | 41% | −3.9 | 3.6 |
| | | | |
| 2400 | 39% | −4.1 | 2.1 |
| 2420 | 38% | −4.2 | 2.1 |
| 2440 | 39% | −4.1 | 2.1 |
| 2460 | 39% | −4.1 | 2.0 |
| 2480 | 39% | −4.1 | 2.0 |
| 2500 | 38% | −4.2 | 1.9 |

Fig.6A

| | EFFI.% | EFFI.dB | Peak Gain dB |
|---|---|---|---|
| 698 | 47% | −3.2 | 2.1 |
| 710 | 46% | −3.4 | 2.2 |
| 720 | 43% | −3.6 | 2.2 |
| 730 | 41% | −3.9 | 2.0 |
| 740 | 44% | −3.5 | 2.3 |
| 750 | 45% | −3.5 | 2.4 |
| 760 | 42% | −3.8 | 2.1 |
| 770 | 40% | −3.9 | 2.0 |
| 780 | 39% | −4.1 | 1.9 |
| 790 | 39% | −4.0 | 1.9 |
| 800 | 40% | −4.0 | 1.9 |
| 810 | 38% | −4.2 | 1.6 |
| 820 | 36% | −4.4 | 1.2 |
| 830 | 34% | −4.7 | 0.9 |
| 840 | 35% | −4.6 | 0.9 |
| 850 | 33% | −4.8 | 0.7 |
| 860 | 33% | −4.8 | 0.5 |
| 870 | 32% | −4.9 | 0.4 |
| 880 | 32% | −4.9 | 0.2 |
| 890 | 31% | −5.0 | 0.0 |
| 900 | 32% | −5.0 | −0.2 |
| 910 | 31% | −5.1 | −0.2 |
| 920 | 31% | −5.1 | −0.3 |
| 930 | 31% | −5.0 | −0.3 |
| 940 | 31% | −5.0 | −0.4 |
| 950 | 31% | −5.0 | −0.5 |
| 960 | 31% | −5.1 | −0.5 |
| ⋮ | | | |
| 1710 | 40% | −4.0 | 3.8 |
| 1730 | 41% | −3.8 | 3.8 |
| 1750 | 43% | −3.7 | 3.8 |
| 1770 | 42% | −3.8 | 3.7 |
| 1790 | 43% | −3.7 | 3.7 |
| 1810 | 43% | −3.6 | 3.7 |
| 1830 | 44% | −3.6 | 3.7 |
| 1850 | 44% | −3.6 | 3.8 |
| 1870 | 44% | −3.6 | 3.7 |
| 1890 | 44% | −3.6 | 3.8 |
| 1910 | 44% | −3.6 | 3.8 |
| 1930 | 44% | −3.6 | 3.7 |
| 1950 | 43% | −3.7 | 3.7 |
| 1970 | 41% | −3.9 | 3.5 |
| 1990 | 41% | −3.9 | 3.5 |
| 2010 | 41% | −3.9 | 3.6 |
| 2030 | 40% | −4.0 | 3.6 |
| 2050 | 40% | −4.0 | 3.5 |
| 2070 | 41% | −3.9 | 3.4 |
| 2090 | 41% | −3.9 | 3.3 |
| 2110 | 40% | −4.0 | 3.2 |
| 2130 | 38% | −4.1 | 3.3 |
| 2150 | 39% | −4.1 | 3.2 |
| 2170 | 38% | −4.2 | 3.0 |

Fig.6B

ANTENNAS FOR MANAGED DEVICES, AND RELATED SYSTEMS AND METHODS

TECHNICAL FIELD

The present invention relates to antennas, and more particularly to compact, multi-network antennas for managed devices.

BACKGROUND

As unattended, managed devices for customer interaction become more prevalent, the reliability and effectiveness at which such devices communicate with their service network(s) and end-users can have a significant impact on customer experience. One example of such unattended, managed devices includes autonomous locker dispensers for completing customer orders. Such autonomous locker dispensers have quickly become a critical tool in the order fulfilment industry. In areas where such autonomous locker dispensers are located, customers can select a locker dispenser as the shipment destination, thereby avoiding various inconveniences that may arise during the delivery process, such as being away when an at-home delivery is attempted.

BRIEF DESCRIPTION OF THE DRAWINGS

The foregoing summary, as well as the following detailed description of illustrative embodiments of the present application, will be better understood when read in conjunction with the appended drawings. For the purposes of illustrating the features of the present application, there is shown in the drawings illustrative embodiments. It should be understood, however, that the application is not limited to the precise arrangements and instrumentalities shown. In the drawings:

FIGS. 6A-6B are tables that show antenna efficiency and peak gain test results for the second sub-antenna (FIG. 6A) and the first sub-antenna (FIG. 6B) at select frequency bands;

DETAILED DESCRIPTION OF ILLUSTRATIVE EMBODIMENTS

Figure 1:
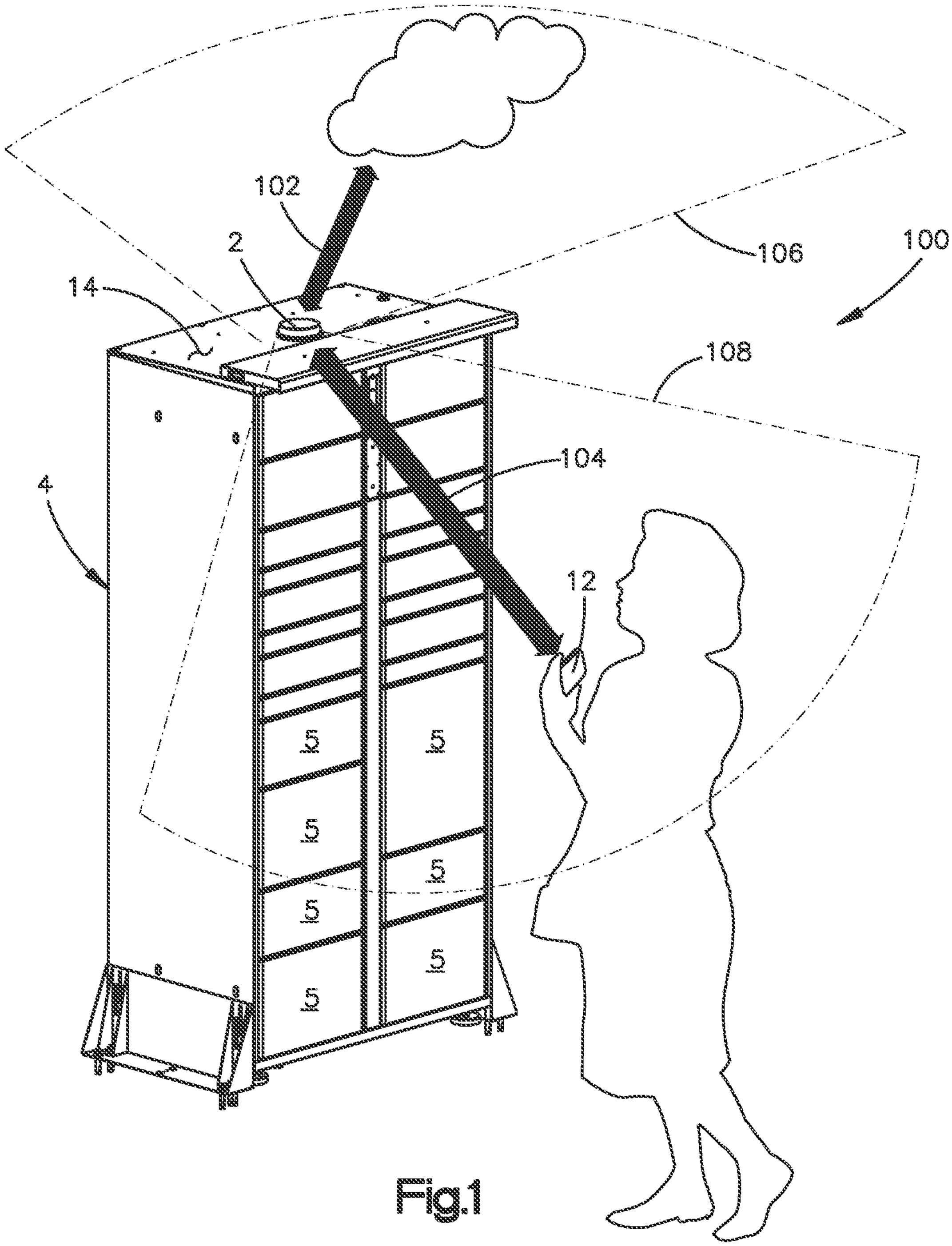
FIG. 1 is a diagram view showing an antenna-connected system that includes a multi-signal antenna unit mounted to an unattended, autonomous locker dispenser, according to an embodiment of the present disclosure.

The present disclosure can be understood more readily by reference to the following detailed description taken in connection with the accompanying figures and examples, which form a part of this disclosure. It is to be understood that this disclosure is not limited to the specific devices, methods, applications, conditions or parameters described and/or shown herein, and that the terminology used herein is for the purpose of describing particular embodiments by way of example only and is not intended to be limiting of the scope of the present disclosure. Also, as used in the specification including the appended claims, the singular forms "a," "an," and "the" include the plural, and reference to a particular numerical value includes at least that particular value, unless the context clearly dictates otherwise.

The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable.

The terms "approximately", "about", and "substantially", as used herein with respect to dimensions, angles, ratios, and other geometries, take into account manufacturing tolerances. Further, the terms "approximately", "about", and "substantially" can include 10% greater than or less than the stated dimension, ratio, or angle. Further, the terms "approximately", "about", and "substantially" can equally apply to the specific value stated.

It should be understood that, although the terms first, second, etc. may be used herein to describe various elements, these elements should not be limited by these terms. These terms are instead used to distinguish one element from another. For example, a first element could be termed a second element, and, similarly, a second element could be termed a first element without departing from the scope of the embodiments disclosed herein.

The embodiments disclosed herein pertain to compact, multi-network antennas that provide long-range, wide-area wireless communication, particularly for cloud-based connectivity, and that also provide short-range wireless communication, particularly for direct communication with end-user devices. These antennas are particularly advantageous for use with unattended, managed devices, such as autonomous locker dispensers 4, which can be located indoors or outdoors and in various weather environments. The compact antenna design allows simple installation and maintenance on such devices while containing all necessary wireless communication components within the same compact housing. Thus, the antennas disclosed herein can be referred to as "all-in-one" antennas. The compact form of these antennas provide numerous other benefits, including a low profile, discrete design that is advantageous for theft prevention and weatherproofing, among other things.

Figure 2A:
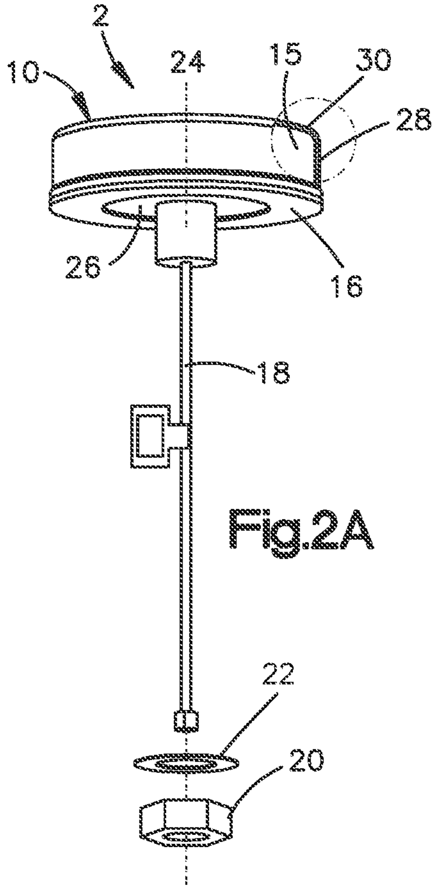
FIG. 2A is a perspective, partial exploded view of the antenna unit illustrated in FIG. 1.
Figure 2B:
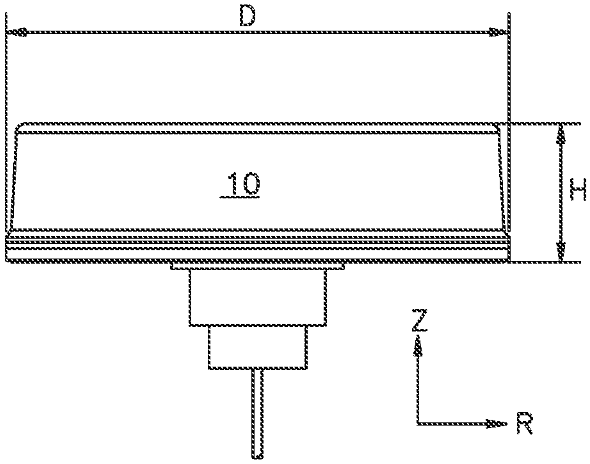
FIG. 2B is a side view of a portion of the antenna unit that includes an antenna housing.
Figure 2C:
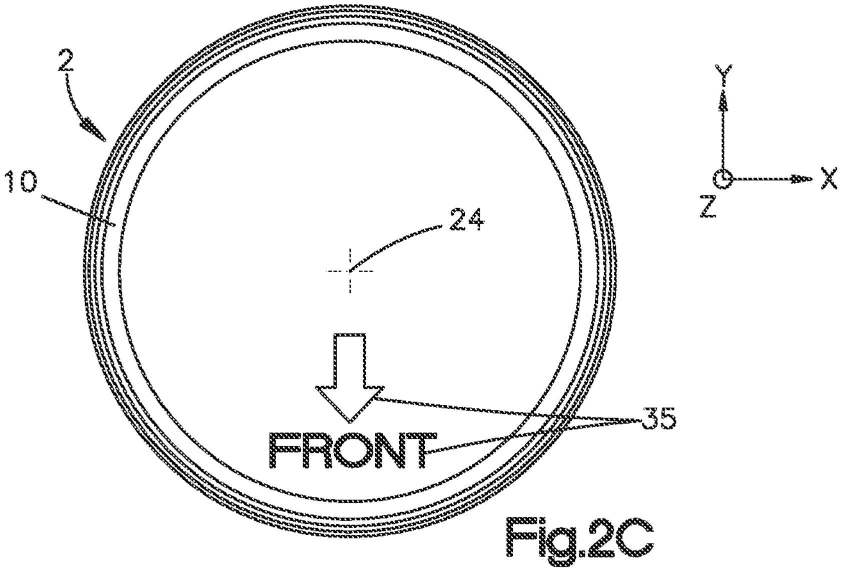
FIG. 2C is a top view of the antenna unit illustrated in FIG. 2A.

Referring to FIG. 1, an antenna-connected system 100 is shown according to an example embodiment of the present disclosure. The antenna-connected system 100 includes an antenna unit 2 mounted to an unattended, managed device, which in this example is an autonomous locker dispenser 4 having a plurality of locker bins 5. The locker dispenser 4 is configured to provide self-service package delivery to customers, who can select a locker location for the delivery destination of their order. The antenna unit 2 of the illustrated example provides two sub-antennas, i.e., first and second sub-antennas 6, 8 (FIGS. 3A-3D) enclosed within a single, compact housing 10 (FIGS. 2A-2C). The first and second sub-antennas 6, 8 provide the locker dispenser 4 with connectivity through at least two (2) wireless communication networks and preferably at least four (4) wireless networks, which are described more fully below. Because the sub-antennas 6, 8 can operate independently, they can each also be referred to as an "antenna" without the "sub" designation.

The first antenna 6 is configured for wireless communication through at least one long-range network 102, such as a cloud-based network, particularly a cloud-based order fulfilment network. In the illustrated example, the cloud-based network is a cellular telecommunications network and the first antenna 6 is itself a multi-band antenna configured for Low-Power, Wide-Area Network (LPWAN) communication and long-range (LoRa) communication. The LPWAN and LoRa communication provide radio-frequency (RF) interfaces with the cellular, cloud-based network. The first antenna 6 employs these modes of wireless communication to send and receive information with a cloud-based order fulfillment network that, among other things, matches a locker bin 5 with a customer order.

The second antenna 8 is configured for wireless communication through at least one short-range network 104, such as for communicating directly with mobile devices 12 of end users. In the illustrated example, the second antenna 8 is a dual-band antenna configured for Bluetooth Low Energy (BLE) communication and Global Positioning System (GPS) communication. The second antenna 8 is configured to exchange information, such as validation data, with an end user, such as for identifying and unlocking the bin 5 in which the end user's ordered item(s) are located.

In one non-limiting example embodiment, the foregoing LPWAN communication can be configured to use LTE Cat M network specifically tailored for Internet of Things (IoT) service; the LoRa communication can be within frequency bands of 700 MHz to 900 MHz and 1700 MHz to 2200 MHz; the BLE communication is at 2.4 GHz; and the GPS communication is at 1.575 GHz. It should be appreciated that the antenna unit 2 can operate according to various other communication parameters.

The antenna unit 2 is coupled to a top surface 14 of the locker dispenser 4 and has a low profile for purposes of avoiding theft or damage. From this top-mounted position, the first and second antennas 6, 8 within the housing 10 are configured to provide the first antenna 6 with a tailored first radiation pattern 106 for LPWAN and LoRa communication with the cloud-based network, while also providing the second antenna 8 with a tailored second radiation pattern 108 for communicating with an end-user device located in a coverage zone in front of the locker dispenser 4. The structures of the antenna unit 2 that provide these radiation patterns 106, 108 are discussed in more detail below.

Referring now to FIGS. 2A-2C, the antenna unit 2 includes a housing 10, a mount 16 coupled to a bottom of the housing 10, a conduit 18 (e.g., coaxial cable) for wired electrical communication between the antenna unit 2 and an electronic control unit 50 (FIG. 4) of the locker dispenser 4, and one or more fasteners 20, 22, such as a nut 20 and washer 22, for attaching the antenna unit 2 to a top panel of the locker dispenser 4. The housing 10 defines an enclosed interior volume 15 for containing the first and second antennas 6, 8 and circuitry coupled thereto. The housing 10 has a shape that is generally cylindrical and extends along a central axis 24, which is oriented along an axial direction Z that is oriented perpendicular to orthogonal lateral directions X and Y. The housing 10 includes a base member 26, a peripheral wall 28 extending from the base member 26 along the axial direction Z, and a top wall 30 opposite the base member 26 along the axial direction Z. In the illustrated embodiment, the peripheral wall 28 and the top wall 30 are monolithic with each other. In other embodiments, the peripheral wall 28 and the top wall 30 can be separate components that are attachable to each other. Because the locker dispenser 4 is configured to be located indoors and outdoors, the antenna unit 2 has weatherproofing features. For example, the housing 10 is configured to prevent moisture from entering the interior 15. For this purpose, the peripheral wall 28 is sealable to the base member 26, which is sealable to the mount 16. The antenna unit 2 of the illustrated embodiment is configured to operate in an operational temperature range of about −30° Celsius to about 70° Celsius (about −22° Fahrenheit to about 158° Fahrenheit), and is also configured to be storable in a storage temperature range of about −40° Celsius to about 85° Celsius (about −40° Fahrenheit to about 185° Fahrenheit). Because the second antenna 8 of the antenna unit 2 is configured to provide the second radiation pattern 108 in a direction-specific manner (for communicating with end-user devices 12 in front of the locker dispenser 4), the top wall 30 can display markings 35, such as an arrow and/or mounting instructions, that identify the proper mounting orientation of the antenna unit 2, as shown in FIG. 2C.

The housing 10 defines a maximum height H measured from a bottom surface of the mount 16 to a top surface of the top wall 30 along the axial direction Z. The housing 10 also defines a maximum width (e.g., diameter) D measured between opposing portions of an outer surface of the peripheral wall 28 along a radial direction R that extends perpendicular from the central axis 24. As shown, the housing 10 can taper inwardly (i.e., the width can diminish) moving from the base member 26 to the top wall 30. In this manner, the housing 10 can have a frusto-conical shape. In the illustrated embodiment, the maximum height His preferably no greater than 50 mm, and even more preferably no greater than 30 mm. The maximum width D is preferably no greater than 160 mm, and even more preferably no greater than 115 mm. The dimensions H, D provide the antenna unit 2 with a low, sturdy profile. In one non-limiting example of the illustrated embodiment, the maximum height H is about 110 mm and the maximum width D is about 31.5 mm. In this particular example embodiment, the antenna housing 10 has a size and shape generally resembling a hockey puck. It should be appreciated that the housing 10 and the foregoing dimensions thereof can be scaled upward or downward in size as needed based on the particular environments and transmission requirements of a particular implementation. Thus, in other embodiments, the maximum height H can be greater than 50 mm and/or the maximum width D can be greater than 160 mm. It should also be appreciated that the cylindrical and/or frusto-conical shape of the antenna housing 10 allows the first and second sub-antennas 6, 8 to be oriented internally in the housing at any angular position about the central axis 24 without changing the outer shape of the housing 10.

Referring now to FIGS. 3A-3D, the configuration of the first and second antennas 6, 8 will now be described according to the illustrated embodiment. The first and second antennas 6, 8 are each coupled to and supported by the base member 26. The base member 26 is preferably constructed of circuit board material and can be characterized as a circuit board. The base member 26 defines an access port 32 providing access for a terminal of the conduit 18, which in this example is a coaxial cable 18. The access port 32 is preferably centered along the central axis 24, although in other embodiments the access port 32 can be offset from the central axis 24. In the illustrated embodiment, the entire coaxial cable 18, or at least substantially an entirety of the coaxial cable 18, resides outside the interior of the housing 10. This arrangement preserves fideltity of the first and second antennas 6, 8, as described in more detail below. The base member 26 also defines a plurality of mounting formations, such as notches and/or apertures, for connecting to various components of the first and second antennas 6, 8.

Figure 3A:
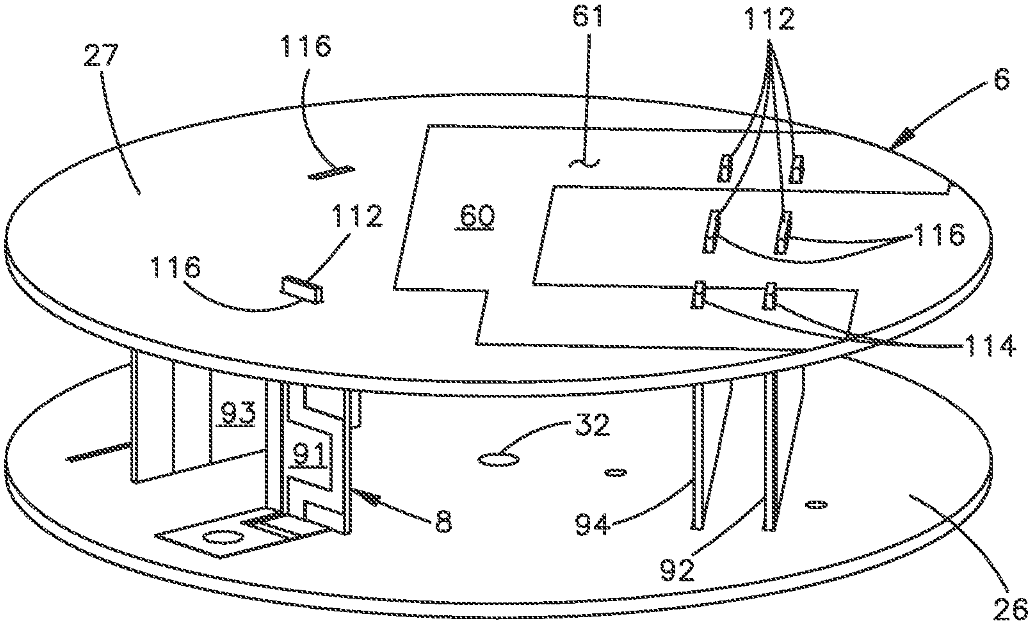
FIG. 3A is a perspective view of first and second sub-antennas that are internal to the antenna housing illustrated in FIGS. 2A-2C and are coupled to a base member and a ceiling member, according to an embodiment of the present disclosure, with the housing removed for illustrative purposes.

As shown in FIG. 3A, the first antenna 6 has a first radiation member 60 that defines a first radiation surface 61. The first radiation member 60 is disposed atop a ceiling member 27 located opposite the base member 26. The ceiling member 27 is preferably constructed of circuit board material and be characterized as a circuit board. In the illustrated embodiment, the ceiling member 27 is supported above the base member 26 by a plurality of circuit board members 91, 92, 93, 94 that extend axially from the base member 26 to the ceiling member 27. At least some of these circuit board members 91, 92, 93, 94 carry active elements of the first and second antennas 6, 8, as described in more detail below. The first radiation surface 61 is substantially planer and is positioned opposite the base member 26 along the axial direction Z. The first radiation surface 61 is positioned at a first orientation, which is substantially orthogonal to the central axis 24 and faces away from the base member 26. In this manner, the first radiation surface 61 causes the first radiation pattern 106 (FIG. 1) to demonstrate strong gain in the axial direction Z, as described in more detail below. Accordingly, when the antenna unit 2 is mounted to the top of the locker dispenser 4, the first radiation pattern 106 extends upward and outwardly (azimuthal) in a mushroom-like pattern, as discussed in more detail below.

Figure 3B:
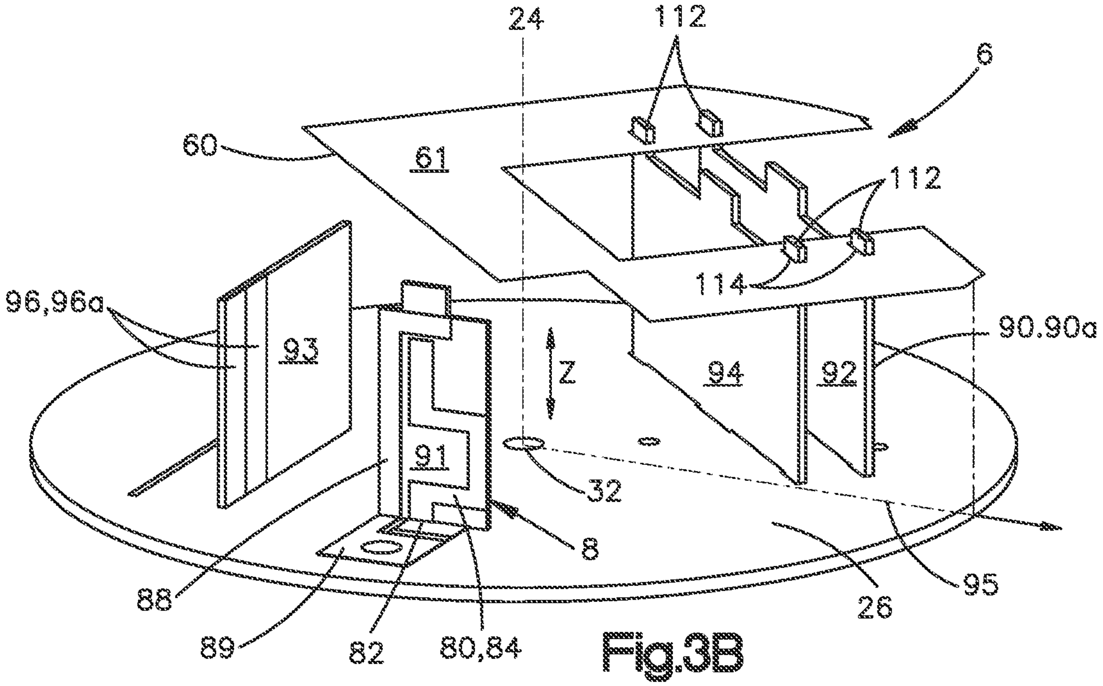
FIG. 3B is another perspective view of the first and second sub-antennas illustrated in FIG. 3A, with the ceiling member removed for illustrative purposes.

Referring now to FIG. 3B, the second antenna 8 is configured to provide the second radiation pattern 108 with a direction-specific gain tailored for providing a connectivity zone in front of the locker dispenser 4. The components that allow the second antenna 8 to achieve this will now be described. The second antenna 8 has a main arm 80 that extends upwardly from an associated feed terminal 82 in the base member 26. The main arm 80 has a second radiation surface 84 that is substantially planar and is oriented substantially parallel with the central axis 24. As shown, the main arm 80 is disposed on a first circuit board member 91 that extends axially from the base member 26. As used herein, the term "axially" and derivatives thereof refer to the axial direction Z. The first circuit board member 91 also has a parasitic arm 88 adjacent the main arm 80. The parasitic arm 88 is in electric communication with a ground terminal 89. The second antenna 8 includes one or more reflectors for shaping the second radiation pattern 108. In the illustrated embodiment, the second antenna 8 includes a first reflector 90 disposed on a second circuit board member 92 and a second reflector 96 disposed on a third circuit board member 93. The second and third circuit board member 92, 93 extend axially from the base member 26. The first and second reflectors 90, 96 define respective first and second reflection surfaces 90*a*, 96*a* that are oriented with respect to the main arm 80 and parasitic arm 88 so as to tailor the second radiation pattern 108 as desired. In the illustrated example, as shown in FIG. 1, the second radiation pattern is tailored toward the area adjacent (e.g., in front of) the locker dispenser 4, thereby allowing end-users to communicate with the locker dispenser 4 via their mobile devices 12 when they are ready to retrieve their item(s).

Figure 3C:
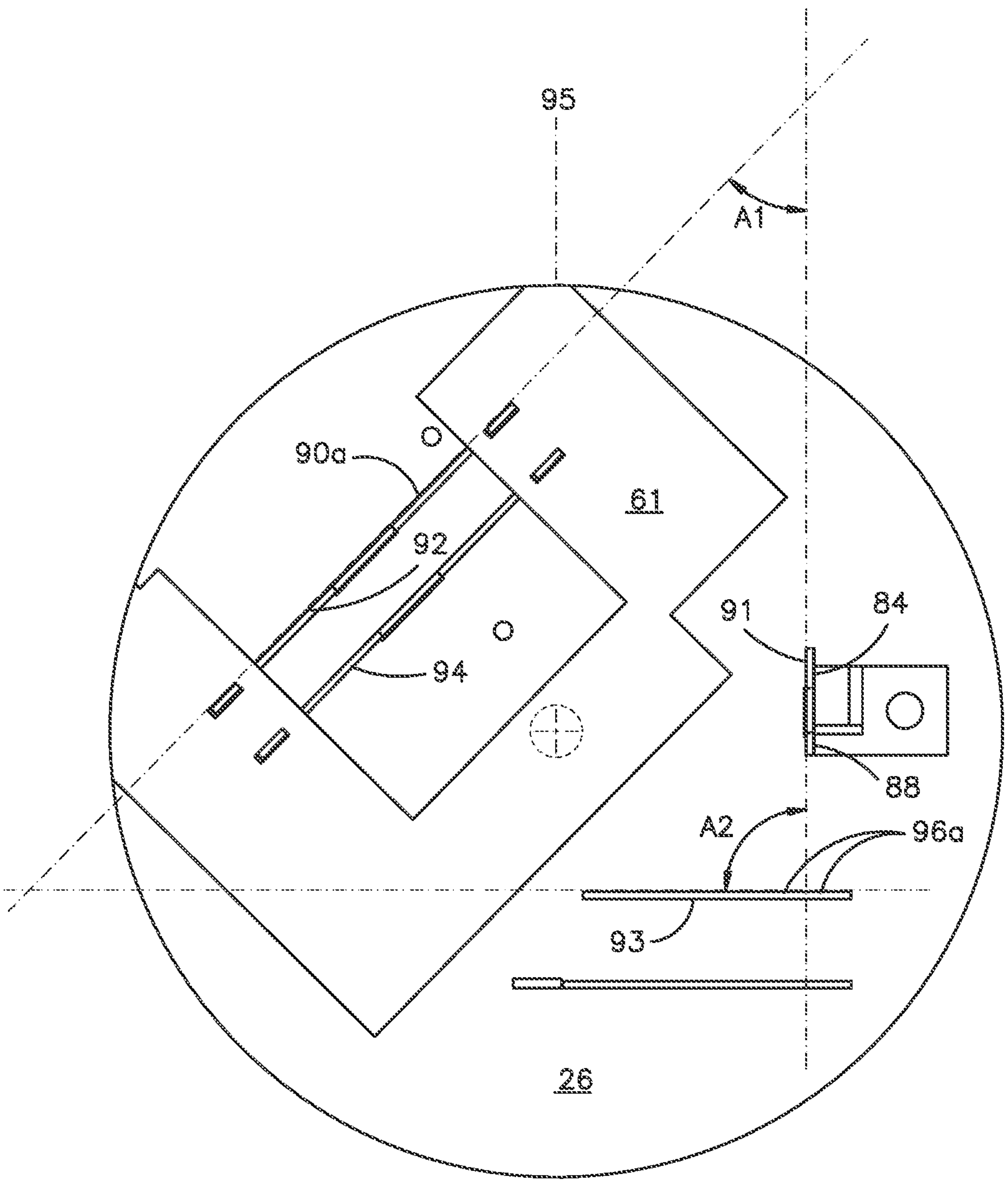
FIG. 3C is a top view of the first and second sub-antennas illustrated in FIG. 3B.

As shown in FIG. 3C, the first and second reflection surfaces 90*a*, 96*a* are angularly offset from the second radiation surface 84 at first and second reflection angles A1, A2, respectively. In the illustrated embodiment, the first reflection angle A1 is about 45 degrees and the second reflection angle A2 is about 90 degrees, each as measured in a reference plane orthogonal to the central axis 24. The sizes, shapes, locations, and orientations of the main arm 80, parasitic arm 88, and reflection surfaces 90*a*, 96*a* are collectively configured to provide a direction-specific radiation pattern 108 that emanates along a radiation centerline 95 in a reference plane orthogonal to the central axis 24. The display markings 35 described above are aligned with the radiation centerline 95, allowing the install technician(s) to properly orient the antenna unit 2 during mounting and assembly. It should be appreciated, however, that the sizes, shapes, locations, and orientations (e.g., reflection angles A1, A2) of the foregoing components can be adjusted as needed to vary the second radiation pattern 108.

Figure 3D:
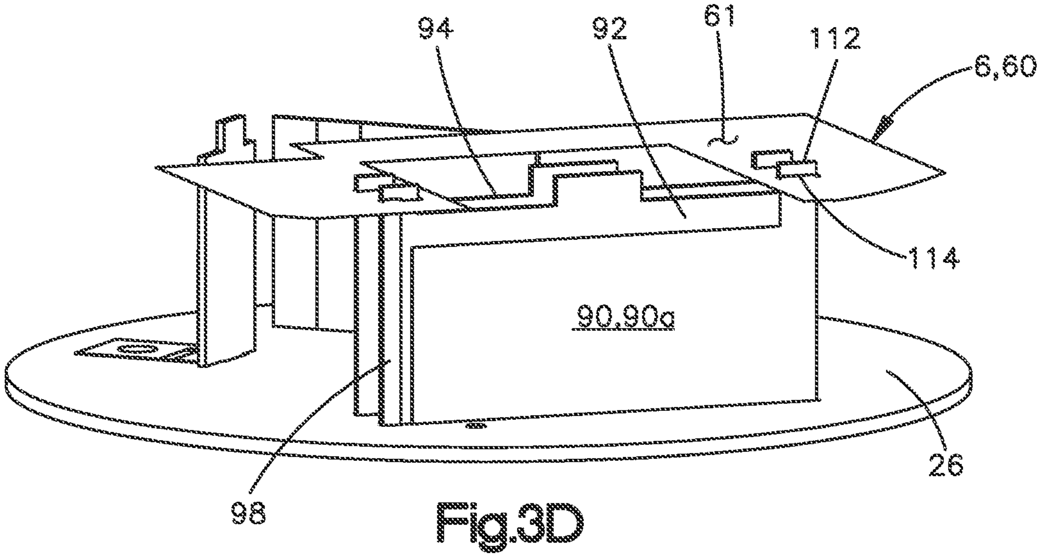
FIG. 3D is another perspective view of the first and second sub-antennas illustrated in FIG. 3A.

As shown in FIG. 3D, the first reflector 90 of the illustrated embodiment doubles as a ground member for the first radiation member 60. The first reflector/ground member 90 has a large surface area relative to the other grounds to disperse electric current sufficient to mitigate radiation noise emanating therefrom as conducted from the first radiation surface 61 and thereby reduce interference between, and preserve fidelity of, the first and second radiation patterns 106, 108. The second circuit board member 92 also carries a feed arm 98 in electrical communication with the first radiation surface 61. As shown, the second circuit board member 92 extends from the base member 26 and interconnects the base member 26 with the first radiation member 60.

Referring again to FIG. 3A, one or more and up to all of the axially extending circuit board members 91, 92, 93, 94 can include coupling members, such as connection tabs 112, that engage complimentary coupling features, such as slots 114, defined in the base member 26 and the ceiling member 27. The third and fourth circuit board members 93, 94 can have connection tabs 112 that engage complimentary slots 114 in the first radiation member 60. As in the illustrated embodiment, the fourth circuit board member 94 need not carry any electrically conductive materials, although in other embodiments it can carry various conductive elements for various purposes.

The inventors have observed that utilizing the circuit board members 91, 92, 93, 94 to provide structural support for the first antenna 6 allows a simpler overall design with few components, which causes the antenna unit 2 to be easier to manufacture than more complicated designs. Moreover, the use of fewer components reduces unwanted reflection, interference, and noise within the housing interior 15, allowing the use of the reflectors 90, 96 despite the smaller size of the housing interior 15. Furthermore, the circuit board members 91, 92, 93, 94, particularly conductive elements thereof, can be soldered to associated terminals (e.g., feed and/or ground terminal(s)) of the base member 26 and/or ceiling member 27 for further increasing structural support of the connected components. The inventors have observed that employing soldered connections further increases the structural strength of the first and second antennas 6, 8 and their constituent components (e.g., arms, reflectors, terminals, joints, etc.). The use of the circuit boards 91, 92, 93, 94 and soldered connections has been observed to provide stronger structural support than screws and other mechanical fasteners.

Figure 4:
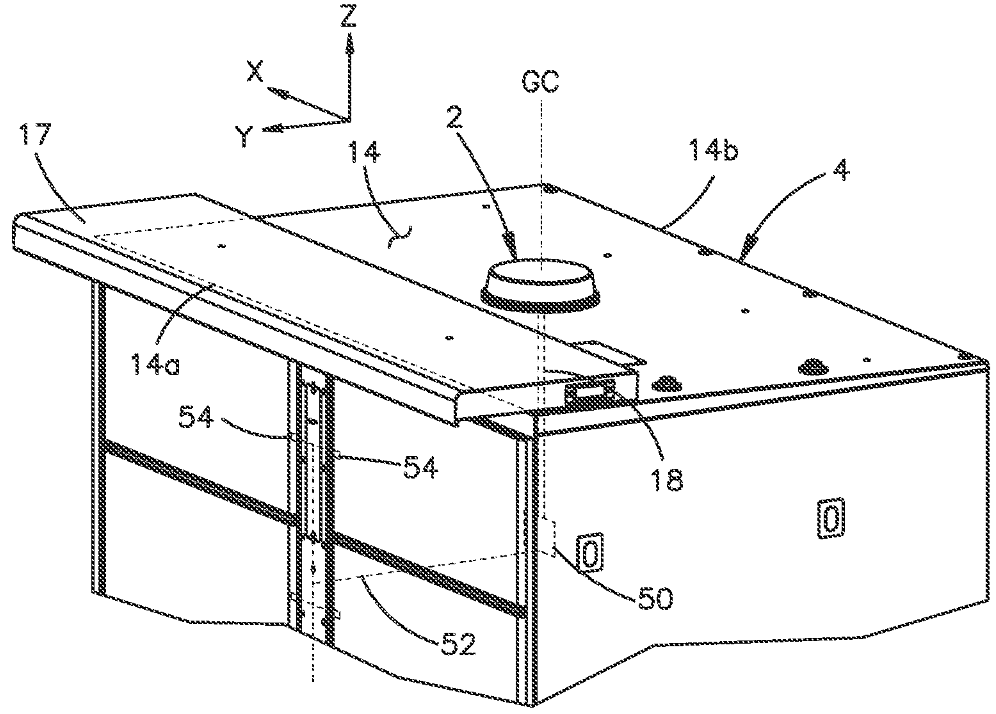
FIG. 4 is a perspective view of a top portion of the autonomous locker dispenser illustrated in FIG. 1, showing a mounting location of the antenna unit, according to an embodiment of the present disclosure.

Referring now to FIG. 4, the antenna unit 2 can be mounted to the top surface 14 of the locker dispenser 4 at a location thereof to optimize coverage of the second radiation pattern 108 for end-user connectivity. In the illustrated example, the antenna unit 2 is mounted at the geometric center GC of the top surface 14. It should be appreciated, however, that other mounting locations on the top surface 14 can be employed. For example, the mounting location can be forward of the geometric center GC (i.e., between the geometric center GC and a front end 14*a* of the top surface 14) along direction Y, thereby also moving the coverage area of the radiation pattern 108 forward to increase the zone of connectivity in front of the locker dispenser 4. In other embodiments, the mounting location can be rearward of the geometric center GC (i.e., between the geometric center GC and a back end 14*b* of the top surface 14) along direction Y, such as for reducing visibility of the antenna unit 2. As shown in FIG. 4, the electronic control unit 50 is preferably on-board the locker dispenser 4 and is in electrical communication, via circuitry 52, with lock actuators 54 that lock and unlock the locker bins 5 individually. The locker dispenser 4 can also include an awning member 17 configured to, among other things, carry lighting for illuminating the front side of the locker dispenser 4.

It should be appreciated that although the unattended, managed device in the illustrated embodiments is an autonomous locker dispenser 4, in other embodiments the antenna unit 2 can be employed with other types of unattended, managed devices, such as vending machines, item dispensers, and the like, by way of non-limiting examples.

Test Results

The inventors tested the design of the illustrated embodiment of the antenna unit 2 shown in FIGS. 2A-3D. Results of those tests will now be described with reference to FIGS. 5A-10C.

Figure 5A:
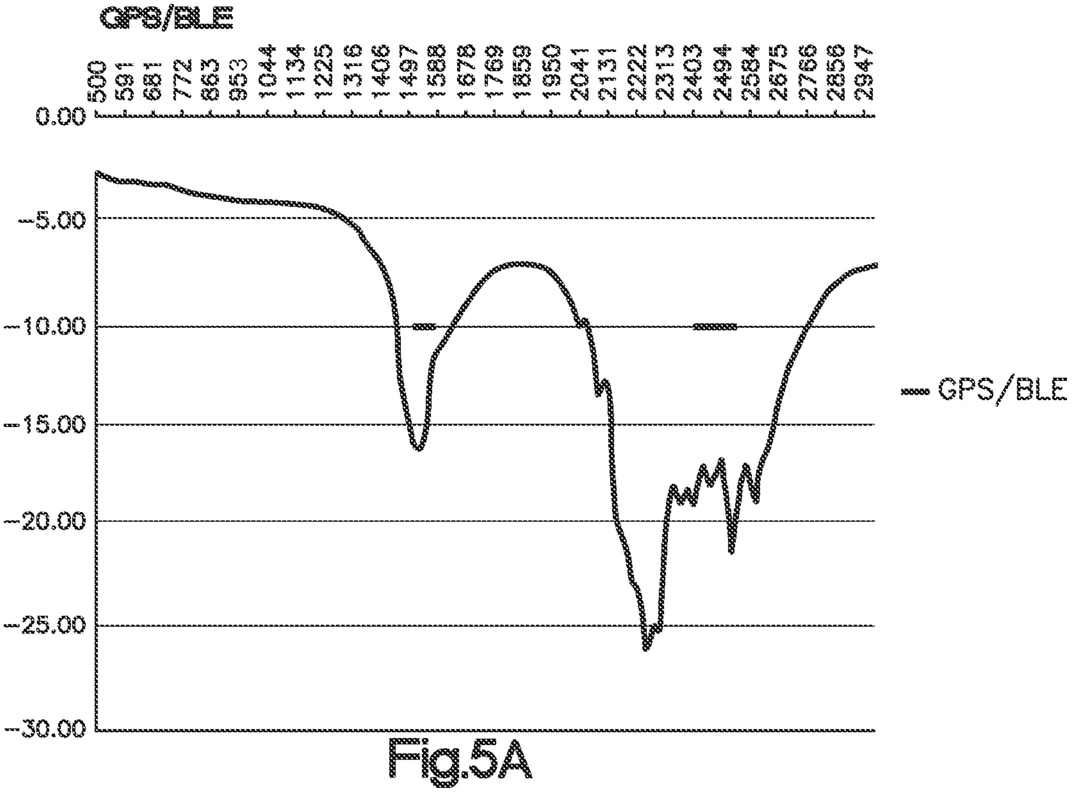
FIGS. 5A-5B, are charts that plot reflection coefficient (S11) results for the second sub-antenna (FIG. 5A) and the first sub-antenna (FIG. 5B) at frequencies ranging from 500-3000 MHz.
Figure 5B:
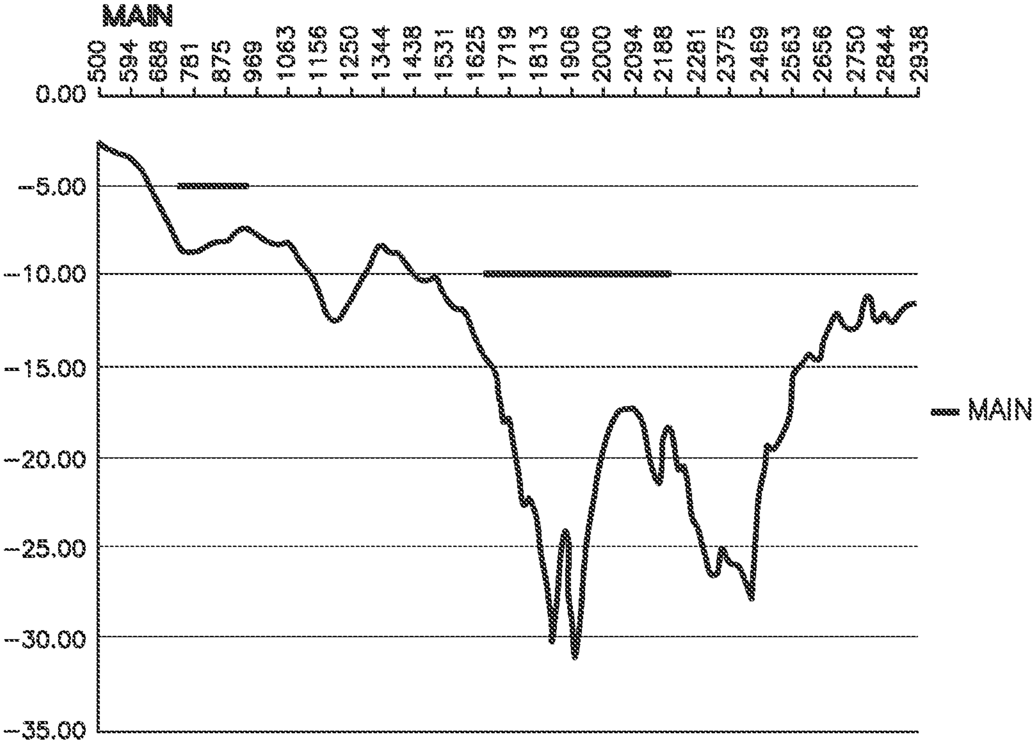

Referring now to FIGS. 5A-5B, reflection coefficient (S11) results are shown for the second antenna 8 (FIG. 5A) and the first antenna 6 (FIG. 5B) at frequencies ranging from 500-3000 MHz.

Referring now to FIGS. 6A-6B, antenna efficiency and peak gain test results are shown. FIG. 6A shows antenna efficiency and peak gain results for the second antenna 8 at frequency bands of 1556-1601 MHz and 2400-2500 MHz. FIG. 6B shows antenna efficiency and peak gain results for the first antenna 6 at frequency bands of 698-960 MHz and 1710-2170 MHz.

Referring now to FIGS. 7A-10C, various 2-dimensional (2D) antenna radiation patterns are charted at select frequency bands in the X-Y, Z-X, and Z-Y planes. In these tests, the −Y direction extends to the front of the locker dispenser 4.

Figure 7A:
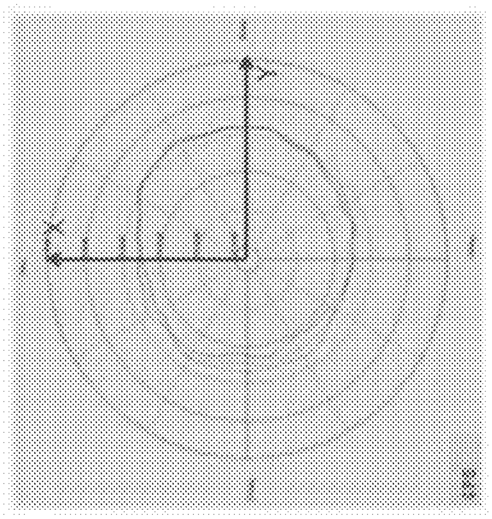
FIGS. 7A-7C are 2-dimensional (2D) charts showing radiation patterns for the second sub-antenna at GPS frequencies of 1556, 1575, and 1607 MHz.
Figure 7B:
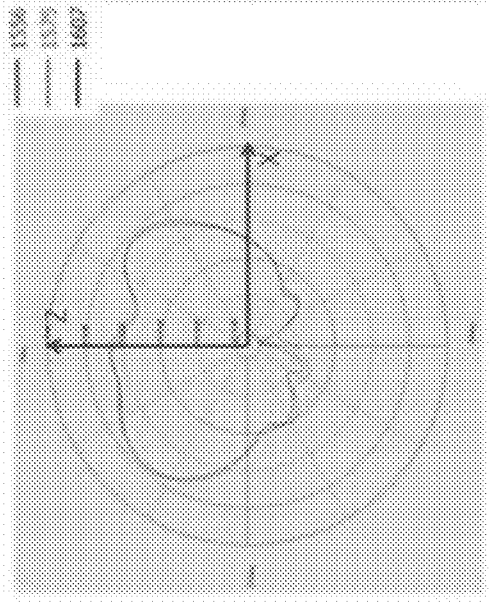
Figure 7C:
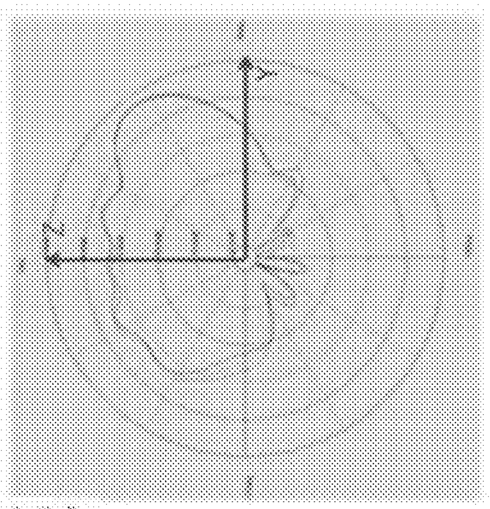

FIGS. 7A-7C show radiation patterns for the second antenna 8 at GPS frequencies of 1556, 1575, and 1607 MHz. In particular, FIG. 7A shows the second radiation pattern 108 in the X-Y plane (i.e., azimuthal plane) at the foregoing GPS frequencies; and FIGS. 7B-7C show the second radiation pattern 108 in the Z-X and Z-Y axial (i.e., vertical) planes at the foregoing GPS frequencies.

Figure 8A:
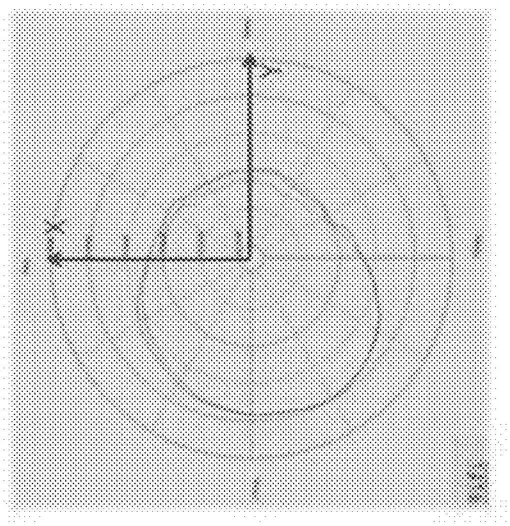
FIGS. 8A-8C are 2D charts showing radiation patterns for the second sub-antenna at WiFi frequencies of 2400, 2440, and 2480 MHz.
Figure 8B:
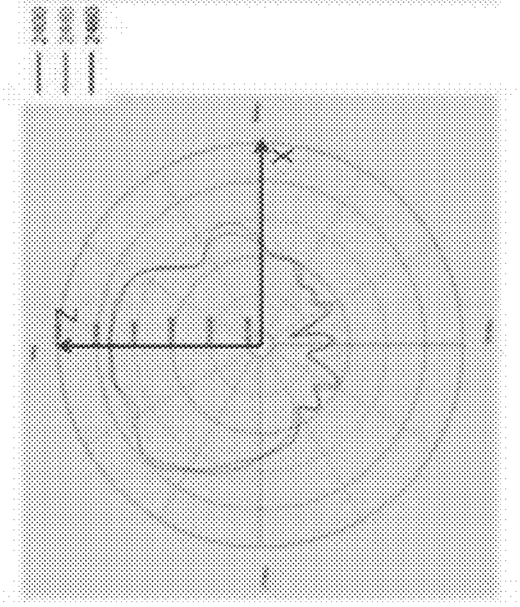
Figure 8C:
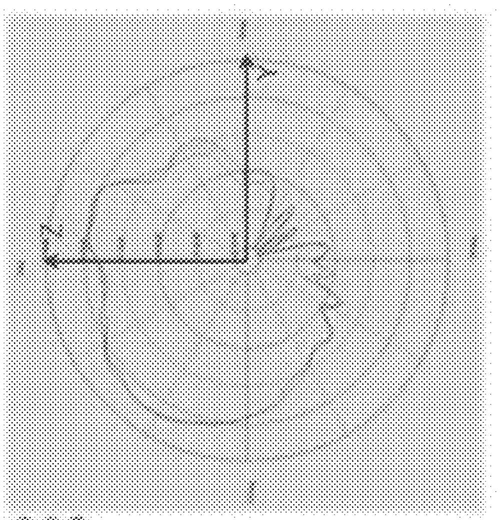

FIGS. 8A-8C show radiation patterns for the second antenna 8 at WiFi frequencies of 2400, 2440, and 2480 MHz. In particular, FIG. 8A shows the second radiation pattern 108 in the X-Y plane (i.e., azimuthal plane) at the foregoing WiFi frequencies; and FIGS. 8B-8C show the second radiation pattern 108 in the Z-X and Z-Y axial (i.e., vertical) planes at the foregoing WiFi frequencies. As demonstrated in FIGS. 8A and 8C, at these WiFi bands, the second radiation pattern 108 demonstrates strong gain in the −Y direction (which is aligned with the front side of the locker dispenser 4), which enhances user connectivity for user located in front of the locker dispenser 4.

Figure 9A:
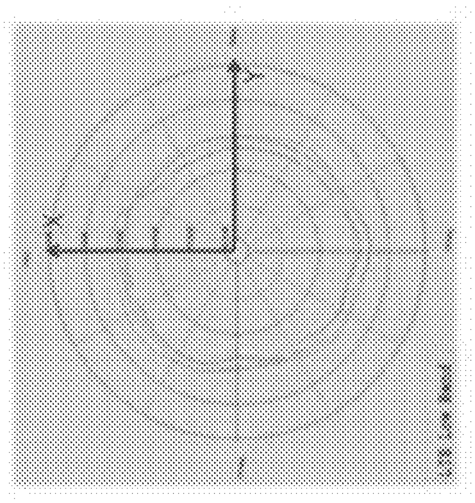
FIGS. 9A-9C are 2D charts showing radiation patterns for the first sub-antenna at LTE low-band frequencies of 698, 746, 880, and 960 MHz.
Figure 9B:
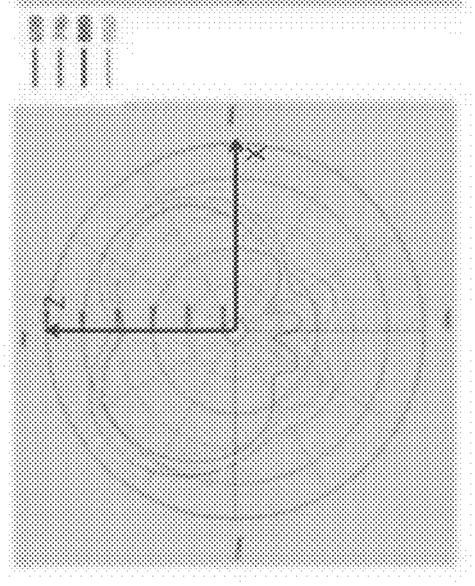
Figure 9C:
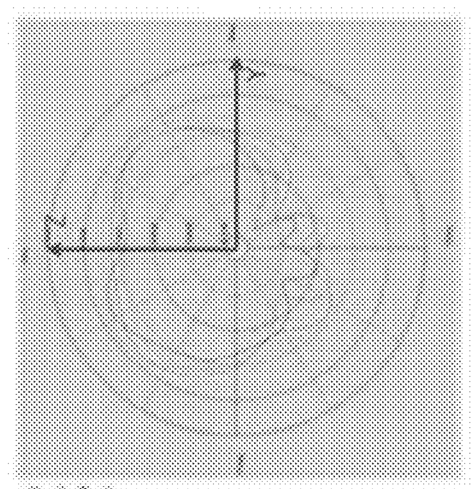

FIGS. 9A-9C show radiation patterns for the first antenna 6 at LTE low-band frequencies of 698, 746, 880, and 960 MHz. In particular, FIG. 9A shows the first radiation pattern 106 in the X-Y plane (i.e., azimuthal plane) at the foregoing LTE low-band frequencies; and FIGS. 9B-9C show the first radiation pattern 106 in the Z-X and Z-Y axial (i.e., vertical) planes at the foregoing LTE low-band frequencies.

Figure 10A:
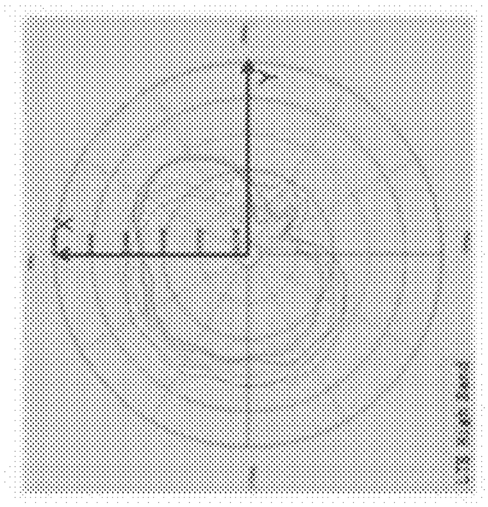
FIGS. 10A-10C are 2D charts showing radiation patterns for the first sub-antenna at LTE high-band frequencies of 1710, 1740, 1880, 1950, 2110, and 2170 MHz.
Figure 10B:
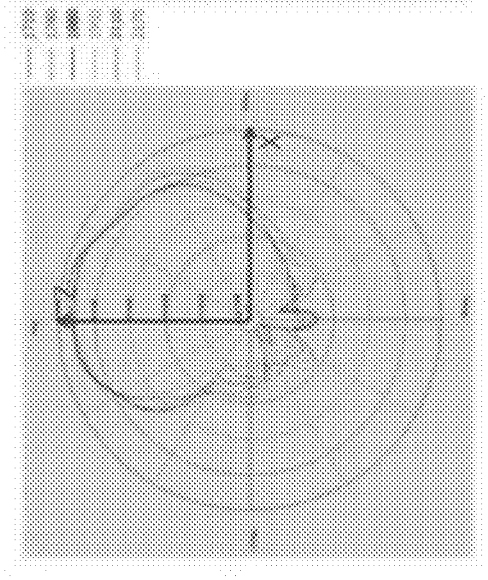
Figure 10C:
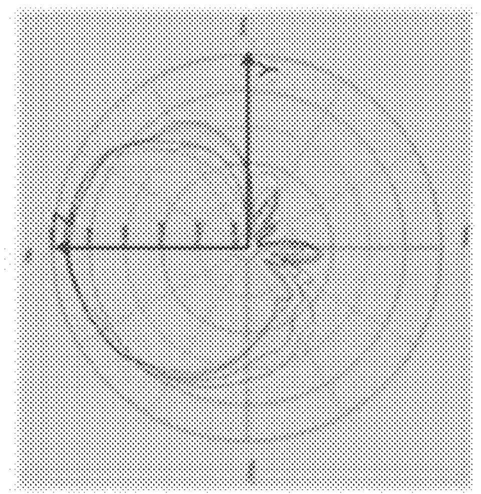

FIGS. 10A-10C show radiation patterns for the first antenna 6 at LTE high-band frequencies of 1710, 1740, 1880, 1950, 2110, and 2170 MHz. In particular, FIG. 10A shows the first radiation pattern 106 in the X-Y plane (i.e., azimuthal plane) at the foregoing LTE high-band frequencies; and FIGS. 10B-10C show the first radiation pattern 106 in the Z-X and Z-Y axial (i.e., vertical) planes at the foregoing LTE high-band frequencies.

As demonstrated in FIGS. 9B-9C and 10B-10C, at the foregoing LTE low-band and high-band frequencies, the first radiation pattern has strong gain in the upward (axial) direction Z and outward (azimuthal) directions X, Y, producing the mushroom-like pattern discussed above, which is advantageous for communication with a cellular, cloud-based network.

Although the disclosure has been described in detail, it should be understood that various changes, substitutions, and alterations can be made herein without departing from the spirit and scope of the invention as defined by the appended claims. Moreover, the scope of the present disclosure is not intended to be limited to the particular embodiments described in the specification. In particular, one or more of the features from the foregoing embodiments can be employed in other embodiments herein. As one of ordinary skill in the art will readily appreciate from that processes, machines, manufacture, composition of matter, means, methods, or steps, presently existing or later to be developed that perform substantially the same function or achieve substantially the same result as the corresponding embodiments described herein may be utilized according to the present disclosure.

What is claimed:

1. An unattended, managed device system, comprising:

an unattended device having a plurality of items that are user-accessible at a front side of the unattended device, wherein the items are individually controlled by an on-board electronic control unit;

an antenna unit mounted atop the unattended device, the antenna unit comprising:

a housing defining a central axis, wherein the housing comprises a base member;

a first antenna providing a first radiation pattern oriented for wireless communication with a cloud-based network, the first antenna having a first radiation surface that is substantially planar and is oriented substantially orthogonal to the central axis; and a second antenna providing a second radiation pattern that is oriented different than the first radiation pattern, wherein the second radiation pattern is oriented for wireless communication with a portable user device, and the second antenna having a second radiation surface that is substantially planar and is oriented substantially parallel with the central axis, wherein the first and second antennas are enclosed within the housing and are supported by the base member; and a ceiling member disposed within the housing and overlaying the base member, wherein the first radiation surface is disposed atop the ceiling member, and the second radiation surface is positioned underneath the ceiling member along an axial direction parallel with the central axis.

2. The unattended, managed device system of claim 1, wherein the second antenna comprises:

a first reflector having a first reflection surface that is substantially planar, wherein the first reflection surface is oriented substantially parallel with the central axis and is angularly offset from the second radiation surface at a first reflection angle; and a second reflector having a second reflection surface that is substantially planar, wherein the second reflection surface is oriented substantially parallel with the central axis and is angularly offset from the second radiation surface at a second reflection angle, wherein the second radiation surface and the first and second reflection angles are configured to provide gain toward the front side of the unattended device.

3. The unattended, managed device system of claim 2, wherein the first reflection angle is about 45 degrees and the second reflection angle is about 90 degrees.

4. The unattended, managed device system of claim 2, wherein the second radiation surface is disposed on a first circuit board member, the first reflector is disposed on a second circuit board member, and the second reflector is disposed on a third circuit board member, wherein the first, second, and third circuit board members extend upwardly from the base member, and at least one of the first, second, and third circuit board members axially supports a ceiling member that overlays the base member.

5. The unattended, managed device system of claim 1, wherein:

the unattended device is a locker unit, the plurality of items is a plurality of locker bins that are individually controlled by the on-board electronic control unit; and the antenna unit comprises a coaxial cable that provides wired communication with the electronic control unit, and the coaxial cable extends downwardly from the antenna housing and between first and second columns of the locker bins.

6. An antenna assembly, comprising:

a housing;

a first antenna providing a first radiation pattern oriented for wireless communication with a cloud-based network; and a second antenna providing a second radiation pattern that is oriented different than the first radiation pattern, wherein the second radiation pattern is oriented for wireless communication with a portable user device, the second antenna comprising a first reflector and a second reflector having first and second reflection surfaces, respectively, that are substantially planar, wherein the first and second antennas are enclosed within the housing, and the first reflector doubles as a ground member in electrical communication with the first antenna.

7. The antenna assembly of claim 6, wherein the housing has outer surfaces that collectively define a housing shape that is selected from a group comprising cylindrical and frusto-conical.

8. The antenna assembly of claim 7, wherein the housing extends along a central axis that is oriented along a first direction, the housing defining a maximum height along the first direction and a maximum width along a radial direction that is perpendicular to the central axis, the maximum height is no greater than 50 mm, and the maximum width is no greater than 160 mm.

9. The antenna assembly of claim 8, wherein the maximum height is no greater than 30 mm, and the maximum width is no greater than 115 mm.

10. The antenna assembly of claim 6, wherein the housing defines an interior that is devoid of cables.

11. The antenna assembly of claim 6, wherein:

the housing defines a central axis;

the first antenna having a first radiation surface that is substantially planar and is oriented substantially orthogonal to the central axis; and the second antenna having a second radiation surface that is substantially planar and is oriented substantially parallel with the central axis.

12. The antenna assembly of claim 11, wherein the housing comprises a base member that supports the first and second antennas.

13. The antenna assembly of claim 12, wherein first reflection surface is oriented substantially parallel with the central axis, and the first reflection surface is angularly offset from the second radiation surface at a first reflection angle.

14. The antenna assembly of claim 13, wherein the second reflection surface is oriented substantially parallel with the central axis, and the second reflection surface is angularly offset from the second radiation surface at a second reflection angle.

15. The antenna assembly of claim 14, wherein the second reflection angle is different from the first reflection angle.

16. The antenna assembly of claim 13, wherein the second radiation surface is disposed on a first circuit board member that extends from the base member, the first reflector is disposed on a second circuit board member that extends from the base member and interconnects the base member to the first antenna.

17. The antenna assembly of claim 16, wherein the second antenna comprises a main arm and a parasitic arm disposed on the first circuit board member.

* * * * *